Sept. 1, 1925.  E. WIECHMANN  1,552,101

VALVE

Filed Oct. 20, 1924

Witness:
R. E. Weber

Inventor
Ernst Wiechmann
By
Attorneys

Patented Sept. 1, 1925.

1,552,101

UNITED STATES PATENT OFFICE.

ERNST WIECHMANN, OF MILWAUKEE, WISCONSIN.

VALVE.

Application filed October 20, 1924. Serial No. 744,779.

*To all whom it may concern:*

Be it known that I, ERNST WIECHMANN, a citizen of the United States, and resident of Milwaukee, in the county of Milwaukee and State of Wisconsin, have invented certain new and useful Improvements in Valves; and I do hereby declare that the following is a full, clear, and exact description thereof.

This invention relates to valves and is particularly directed to a valve for a spigot although it is to be understood that it may be used in other capacities.

In spigots and similar valves as heretofore constructed, it has been the custom to provide a yielding member commonly known as a "Fuller ball" which contacts with the seat formed in the body portion of the spigot or valve housing. These spigots, however, have given considerable trouble when used with certain types of fluids such, for instance, as hot water and other fluids which gradually disintegrate the flexible ball. This disintegration does not take place primarily when the valve is open and the water flowing therethrough, but does occur mainly through the long periods when the valve is closed and the water stands in contact with at least a portion of the flexible member. It is to be understood that any detrimental action continues throughout the entire period during which the valve is inactive or closed, and consequently even a slight action of the fluid upon the Fuller ball or similar member will, during the long periods in which the valve is not used, cause disintegration and will cause the valve to rapidly deteriorate and finally leak, thus necessitating frequent renewal.

This invention is designed to overcome the above noted defects, and objects of such invention are to provide a valve construction which protects the flexible washer or member from contact with the fluid when the valve is closed, whereby the life of the valve is materially increased as the flexible member is subjected to the action of the fluid only during the time when the valve is actually opened and at all other times is adequately and fully protected from such detrimental action.

Further objects are to provide a valve construction which has extreme simplicity, which may be very cheaply produced, and which may successfully compete with the ordinary types of valves on a commercial basis, and which may be as readily and easily applied to the valve rod as the valves now on the market.

An embodiment of the invention is shown in the accompanying drawings, in which:—

Figure 2:
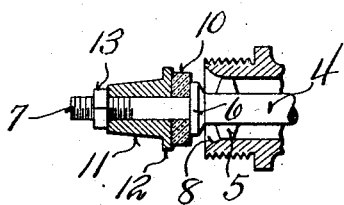
Figure 2 is a fragmentary view corresponding to Figure 1 showing the valve open.

Referring to the drawings, it will be seen that a conventional spigot 1 has been shown which is equipped with an operating spindle 2 provided with the usual handle and provided with a crank 3 at its lower end. This crank is operatively engaged by the forward end of a valve rod 4 which is provided preferably with spacing and guiding lugs 5 adapted to ride within the tubular body portion, and which is further provided with a collar 6 preferably integral with the rod. The rod is extended rearwardly and is provided with a threaded portion 7. The body portion, it will be noted, is provided with a rounded valve seat 8 at its rear end and is externally threaded and adapted to screw into a supply pipe 9. A flexible washer 10 is slipped upon the valve rod and is pushed into contact with the collar 6. This flexible washer may be of any suitable material such as rubber, yieldable fiber, flexible packing material or any of the usual materials employed for yielding valve washers. A metal backing member 11 is slipped upon the valve rod and is provided with a flange 12 which extends beyond the peripheral outline of the valve 10, as shown clearly in Figures 2 and 3. This metal backing member is held in place by means of a nut 13 screwed upon the threaded extension 7 of the valve rod and thus in turn holds the valve 10 in correct position.

Figure 1:
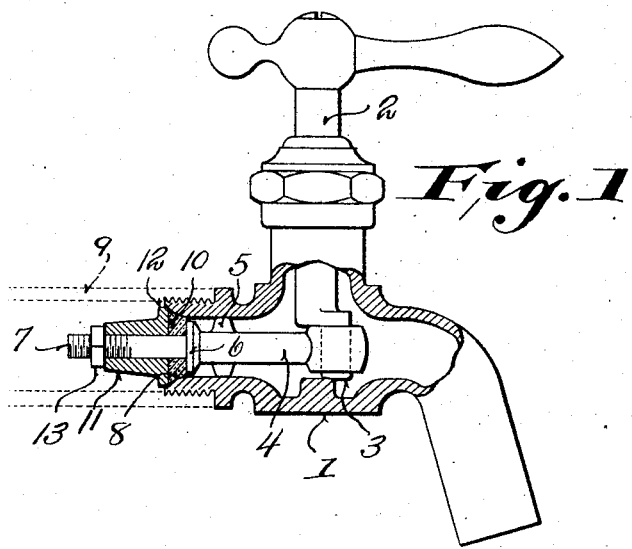
Figure 1 is a partial sectional view through a spigot showing the valve in closed position.

When the valve is closed, as shown in Figure 1, the washer 10 conforms to the valve seat 8 and seals the valve. However, it is to be particularly noted that the backing member 11 contacts also with the valve seat or with the rear portion of the valve housing and seals against such housing or valve seat. This effectively prevents contact of the fluid in the supply pipe 9 with the flexible washer 10 when the valve is closed, and thus prevents disintegration of the flexible washer during the period in which the valve is closed.

It is to be noted that the conventional type of spigot has been shown provided with a curved or slanting valve seat 8. It is to be further noted that the backing member 11, although shown as a cast member in the drawings, may also be formed of a sheet metal stamping. This metal backing member may be made of any suitable metal. For instance, it may be made of a soft metal and may conform to the valve seat itself, although it is to be understood distinctly that it may also be made of a harder metal and may conform to the seat or may seat itself against the rear portion of such seat. At all events the backing member completely cuts off the fluid in the pipe 9 from contact with the flexible washer and thus protects the flexible washer from the deteriorating action of the liquid in the pipe 9 while the valve is closed.

Figure 3:
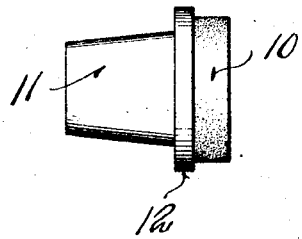
Figure 3 is an enlarged view of the valve itself detached from the valve rod.

It is to be understood that the backing member 11 and the washer 10 may be sold as a separate and distinct unit, as illustrated in Figure 3, and may be applied to any existing type of valve rods in place of the usual Fuller balls and similar devices. When finished, it is preferable to glue or cement or otherwise secure the washer 10 to the backing member 11 so that during handling and transporting, these two portions will stay together as a unit.

It is to be understood though that when they are positioned upon the valve rod that they will be held in correct position by means of the nut 13.

It will be seen, therefore, that a very simple and cheaply manufactured type of valve construction has been provided which effectively prevents contact of the liquid in the supply pipe with the flexible washer during the periods when the valve is closed.

It will further be seen that the device may be manufactured and sold as cheaply as the conventional types of valves such as Fuller balls for instance and that they may be applied to existing types of spigots or similar devices.

Although the invention has been described in considerable detail, it is to be understood that the invention may be variously embodied and is, therefore, to be limited only as claimed.

I claim:

In a spigot having a body portion, an operating spindle provided with a crank, a valve rod operatively coupled to the crank and having a collar thereon, and a rearwardly extending portion, the combination of an annular valve seat convex in cross section, a relatively soft disk like valve having a cylindrical outer surface, said disk being positioned upon the rearwardly extending portion of said valve rod and against said collar, a metal backing member positioned upon said valve rod rearwardly of said valve, and adapted to engage said valve seat when said spigot is fully closed, and a nut screwed upon the rearwardly extending portion of said valve rod and forcing said backing member against said valve, said backing member being of a diameter greater than said valve at its front end, and said valve contacting with the convex valve seat approximately at the central portion of its convex surface.

In testimony that I claim the foregoing I have hereunto set my hand at Milwaukee, in the county of Milwaukee and State of Wisconsin.

ERNST WIECHMANN.